United States Patent
Dittrich et al.

[11] 3,738,759
[45] June 12, 1973

[54] APPARATUS AND METHODS FOR FLOW PHOTOMETRY OF PARTICLES OF A DISPERSION

[76] Inventors: Wolfgang Dittrich, Am Krug 42;
Wolfgang Göhde, Lohafenerweg 39, both of Muenster, Germany

[22] Filed: Apr. 16, 1970

[21] Appl. No.: 29,215

Related U.S. Application Data

[63] Continuation-in-part of Ser. No. 884,651, Dec. 12, 1969, abandoned.

[30] Foreign Application Priority Data

Apr. 18, 1969 Germany.................. P 19 19 628.2

[52] U.S. Cl. ......... 356/208, 250/218, 250/222 PC, 356/246
[51] Int. Cl. ........................................... G01n 21/26
[58] Field of Search ................. 356/102, 103, 207, 356/208, 36, 39, 244, 246; 250/218, 222 PC

[56] References Cited
UNITED STATES PATENTS

| | | | |
|---|---|---|---|
| 3,493,304 | 2/1970 | Rovner | 250/71 R |
| 3,609,048 | 9/1971 | Strickler | 356/246 |
| 3,254,558 | 6/1966 | Gramm | 250/222 PC |
| 3,413,464 | 11/1968 | Kamentsky | 356/39 X |
| 2,626,361 | 1/1953 | Martine | 356/207 |
| 3,541,336 | 11/1970 | Einstein | 356/207 X |
| 3,462,609 | 8/1969 | Beattie | 356/103 X |

*Primary Examiner*—Ronald L. Wibert
*Assistant Examiner*—F. L. Evans
*Attorney*—D. C. Roylance, David S. Abrams, Robert H. Berdo, Donald A. Kaul, Walter C. Farley and John D. Crane

[57] ABSTRACT

In flow photometry by means of transmitting light from a light source to a flowing dispersion in a measuring zone and from the dispersion to a photosensitive receiver and associated apparatus for measuring and/or counting the particles of the dispersion and in which there is an optical axis extending from the measuring zone to the photosensitive receiver, the improvements in which the dispersion is caused to flow through the measuring zone with a velocity component parallel to the optical axis, and a stream of the dispersion medium optically empty or other optically empty fluid of like refractive index is directed to wash the dispersion from the measuring zone or to form an envelope around the dispersion as the dispersion is introduced into the measuring zone.

6 Claims, 5 Drawing Figures

APPARATUS AND METHODS FOR FLOW PHOTOMETRY OF PARTICLES OF A DISPERSION

This is a continuation-in-part of application Ser. No. 884,651, filed Dec. 12, 1969, now abandoned.

This invention relates to apparatus and methods for the flow photometry of particles of a dispersion, particularly to such apparatus provided with an automatic measuring and counting device and in which all particles to be measured and counted traverse the depth of focus range of a microscope arrangement used. The particles to be measured and counted may be, for example, blood corpuscles, tumor cells, single-cell algae, plankton, bacteria, and the like.

It is an object of the invention to provide improvements upon the apparatus described in detail in the aforementioned parent application.

The device more fully described in the aforementioned application permits scanning the particles optically in a rapid flow process; during the passage of the particles through a fixed measuring point, specific light pulses correlated with the particle properties are transformed into electric pulses, which can then be recorded by means of suitable amplifier and counting devices. In this way, physical, physical-chemical and chemical properties of a plurality of particles of a certain collection can be determined simultaneously with the aid of an automatic measuring and counting device during flow.

The fixed measuring area of the measuring and counting device described in said application, at which the particle properties are determined by an optical method, lies within a nozzle aperture which is traversed by the dispersion approximately in the direction of the optical axis of a microscope arrangement comprising the apparatus. Nozzles of other design are generally unsuitable for this counting and measuring device, because specific optical facts are at hand to which the special design of the nozzle or nozzle aperture must be adapted. Prior art devices in which a dispersion stream is conducted transversely to the optical axis do not give photoelectric current signals quantitatively correspondingly to the particle properties in a unique manner.

According to the present invention, there is provided a device for flow photometry of particles having a measuring area which is not definitely fixed by the rigid walls of a flow chamber and the position of which results also from the dynamic interaction of the flowing dispersion with one or more streams of optically empty (i.e., particle-free) dispersion medium or of another optical medium of equal light refraction index and can accordingly be varied within certain limits. Another object of the invention, following therefrom, is to provide flow chambers for such device. Further, it is an object underlying the invention to introduce an arrangement for flow photometry where the total volume also of a larger particle contributes to the photo current signal in a consistent manner without giving preference to a detail of the particle traversing the measuring point corresponding to the optimum of the depth of field of the microscope arrangement. In connection with suitable flow chambers using selectively illumination by transmitted and/or incident light or dark-field illumination and simultaneous direction of the light stream onto several photomultipliers with electronic evaluation, a versatile, multiparametric automatic measuring and counting device is provided.

The objects of the invention are attained by, for one thing, the provision of a specific design for the scanning device or nozzle in connection with a microscope arrangement; each particle of the dispersion furnishes photoelectric current signals uniquely correlated to certain particle properties. More particularly, a flow chamber having certain characteristics is used in connection with an incident and/or transmitted light microscope. The essence of the flow chamber used is that all particles of the dispersion entering the measuring zone of the microscope arrangement and to be counted and/or measured are forced to traverse the depth of field of the microscope arrangement in a consistent manner with a velocity component parallel to its optical axis. This requirement is fulfilled by the flow chamber described in the aforementioned application in that in the flow chamber of that application the particles are drawn or pushed through a uniformly illuminated nozzle in the direction of the optical axis of the microscope, the aperture of which is sharply projected onto the measuring diaphragm or onto the surface of the photomultiplier. According to the present invention, however, the construction of a nozzle serving as measuring point may be wholly or partially dispensed with when the dispersion is moved in a thin jet, surrounded by an enveloping stream of the optically empty dispersion medium or of another medium having the same index of refraction through the measuring zone projected completely onto one or simultaneously onto several photomultipliers or measuring diaphragms with a velocity component parallel to the optical axis and, hence, through the entire depth of field of the microscope objective.

The use of an enveloping stream offers in particular the advantage of a uniform flow velocity of the dispersion at uniform orientation, brought about by hydrodynamic forces, of those particles which greatly differ from the spherical form. According to the invention, there is also provided with incident light illumination an especially simply designed flow chamber, in which the dispersion issues from a cylindrical channel or a nozzle in the direction of the photo-sensitive receiver and is conducted away from the measuring area by a stream of the optically empty dispersion medium or another liquid having the same optical properties, directed transversely thereto. As compared with prior art arrangements, this has the advantage that no particles of the dispersion can become caught inside the measuring zone of the flow chamber or adhere to the chamber wall, whereby the measurement result could be adversely influenced. Also here, by suitable adjustment of the illumination, it can be achieved according to the invention that the proportion of dispersed and/or fluorescent light arriving from each particle of the dispersion on one or more photomultipliers remains approximately constant at a displacement in the direction of the optical axis corresponding to the greatest particle diameter, and that thus the amplitude value of the emitted photoelectric current signals furnishes an unambiguous measure of the particle optical properties.

According to the invention, a flow chamber of the invention is used together with an incident and/or transmitted light microscope and with electronic devices for the counting and/or recording of the frequency distributions of the particles of a dispersion. Instead of a complete microscope, under certain conditions an objective alone may be sufficient, the measuring diaphragm or the photo-sensitive receiver being arranged in the "intermediate image plane". For the determination of the number of particles per unit volume, the measuring and counting device is equipped, according to the invention, with devices which permit the simultaneous recording or calculation of the dispersion volume passing through the flow chamber. In particular, it is intended to insure a specific rate of flow of the dispersion by means of a uniformly working pump or to force or draw a given volume of dispersion through the flow chamber.

Preferred embodiments of the invention will now be described in conjunction with the drawings, in which:

FIG. 3 is a partly broken away isometric view of a flow chamber of the invention.

Figure 1:
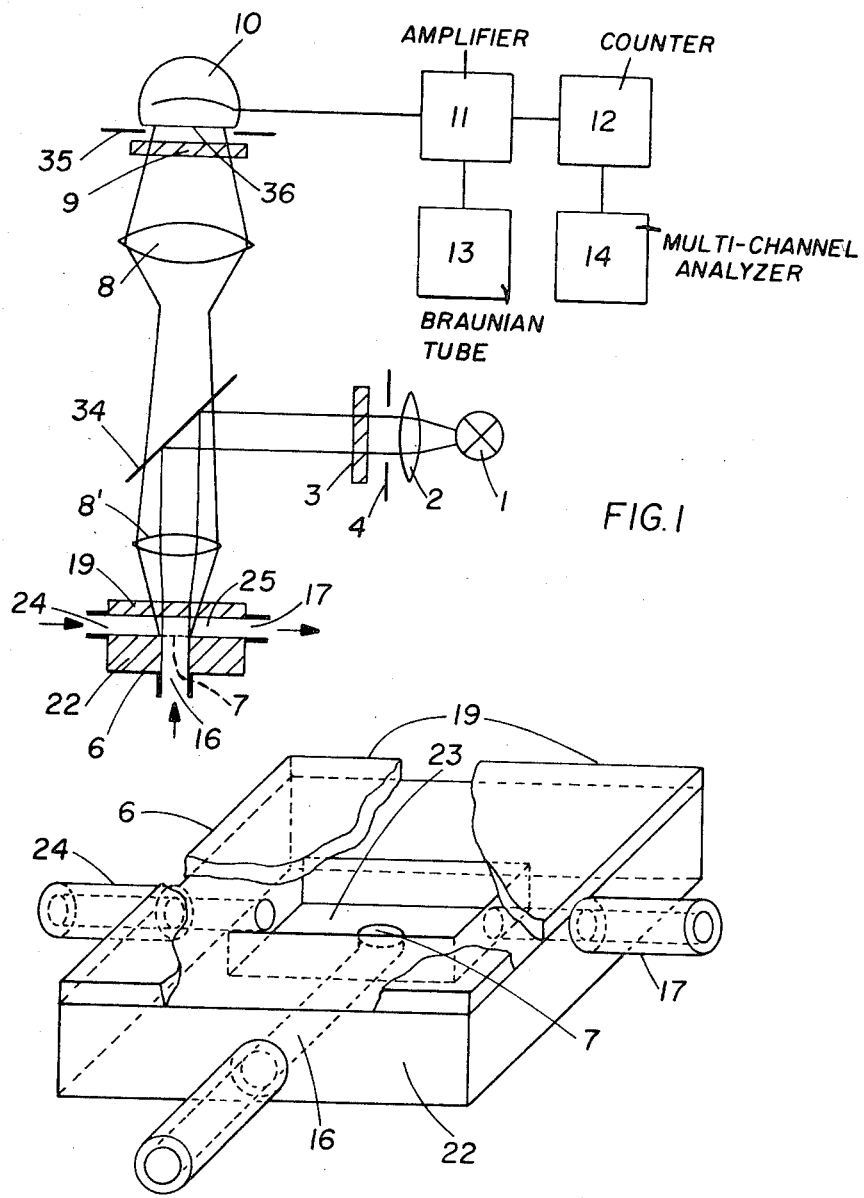
FIG. 1 is a schematic diagram of an entire measuring and counting device according to the invention.
Figure 2:
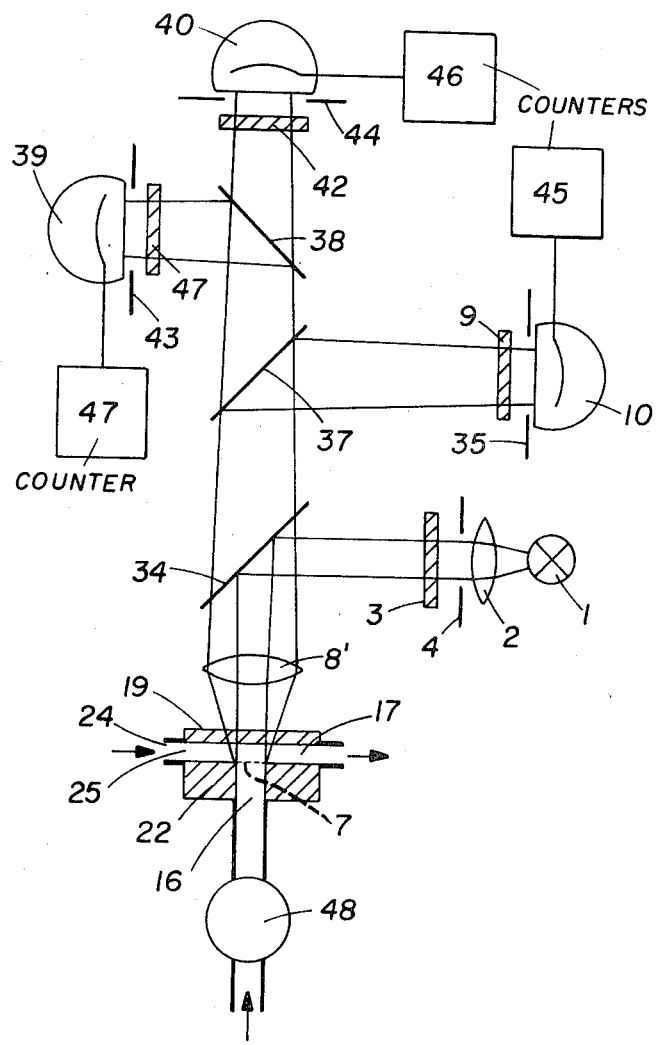
FIG. 2 is a schematic diagram of an entire measuring and counting device according to the invention for the simultaneous pick-up of up to three parameters.

Light from a constant light source 1 passes through a collector lens 2, a field diaphragm 4, an exciter filter 3 and an objective 8' which serves as condenser lens for light from the source 1 and falls on a measuring area 7 inside a flow chamber 6 (FIGS. 1 and 2). The flow chamber consists of a base body 22 of corrosion-resistant metal or of glass, for example, with a bore 16 parallel to the optical axis of a microscope arrangement at least at the measuring point 7. Bore 16 serves as the inflow channel for the dispersion. The microscope arrangement comprises lenses 8 and 8' defining a microscope objective. In base body 22' of the slightly modified embodiment shown in FIG. 3, the inflow aperture and measuring area 7 is located in a shallow, tub-shaped depression 23. There is provided an inflow channel 24 and an outflow channel 17 for a cross stream. Facing a photo-sensitive receiver (photomultiplier) 10 the depression 23 is covered with a plane-parallel plate 19 of light-transmitting material (e.g., glass or quartz). Dispersed light and/or fluorescent light emitted by the particles passing the measuring point 7 falls, via the lens 8', an optical divider disk 34 which serves to illuminate the measuring point 7 with incident light from the source 1, the lens 8, an exciter light barrier filter 9 and a measuring diaphragm 35, on the photo-sensitive surface 36 of the photomultiplier 10.

The photoelectric current signals emitted by the receiver 10 are amplified by means of an electronic amplifier 11 and counted by an electronic counting device 12. A Braunian tube 13 serves to control the photoelectric current signals. Histograms of the photoelectric current pulse heights can be obtained with the aid of a multi-channel analyzer 14.

In FIG. 2 is illustrated a measuring and counting device for simultaneous pick-up of up to three mutually independent parameters. The light emitted by the particles passes through the lens 8' onto an optical divider plate 37. A portion of the light then passes through a light filter 9 for the selection of a wave length range, correlated to the first parameter, of the light emitted by the particle and through a measuring diaphragm 35 onto the photomultiplier 10. From the divider plate 37 part of the remaining light passes through a second divider plate 38 onto a photomultiplier 39 and the other part is transmitted by the divider plate 38 to a photomultiplier 40. Before photomultipliers 38 and 40 are respective light barrier filters 41 and 42 for the selection of the wave length ranges, correlated to the second and third parameters, of the light emitted by the particle, and respective measuring diaphragms 43 and 44. The photoelectric current signals obtained from each photomultiplier are counted as described for FIG. 1 and/or recorded in accordance with the amplitude value, either of which type of apparatus is schematically illustrated by the boxes 45, 46 and 47. With the aid of a uniformly working pump 48 a constant rate of flow of the dispersion through the flow chamber is achieved; the determination of the number of particles per unit volume is thus possible.

Figure 4:
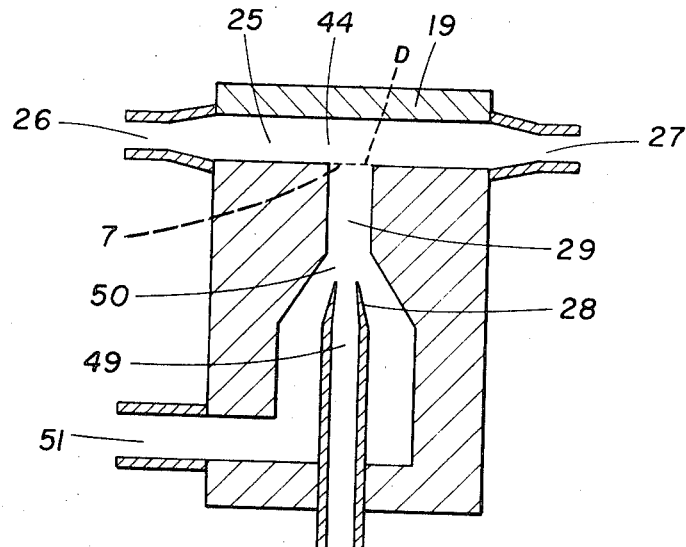
FIGS. 4 and 5 are cross sectional views of two other flow chambers according to the invention.

FIG. 4 is another construction of a flow chamber in which the dispersion stream is first guided parallel to the optical axis of the microscope. The dispersion passes through a capillary tube 28 to the beginning of a narrow channel 29; the dispersion stream 49, which is surrounded by an enveloping stream 50, flows through the narrow channel 29, which opens at 7 into a wide channel 25 extending at right angles to the optical axis. The object plane 0 of the microscope is at the point of confluence 7 or a little thereabove. Through the aperture 51 the fluid to constitute the enveloping stream is admitted. This is a fluid not having any particles dispersed therein (optically empty) and having the same index of refraction as the dispersion medium. Through the aperture 26, likewise optically empty fluid again with the index of refraction of the dispersion medium is admitted as the cross stream 44 which functions to carry the dispersion very rapidly from the measuring area 7 off to the side.

The two or, when using an enveloping stream, three liquid components traversing the chamber are conducted away or sucked off through the aperture 27. Through the light-transmitting, planar plate 19 the measuring area 7 is illuminated according to the incident light method, and at the same time the dispersed and/or fluorescent light signals emitted by the particles pass through the cover plate 19 into the microscope.

When not needed, the enveloping stream, which standardizes the rate of flow of the particles of the dispersion and also, in the case of a greater deviation of the particles from the spherical form, favors uniform orientation of the particles with the largest diameter in the direction of flow, may be dispensed with. For this purpose, the inlet 51 is not employed. The narrow channel 29 is then traversed only by the dispersion, which is conducted away from the measuring point 7 above the point 7.

Figure 5:
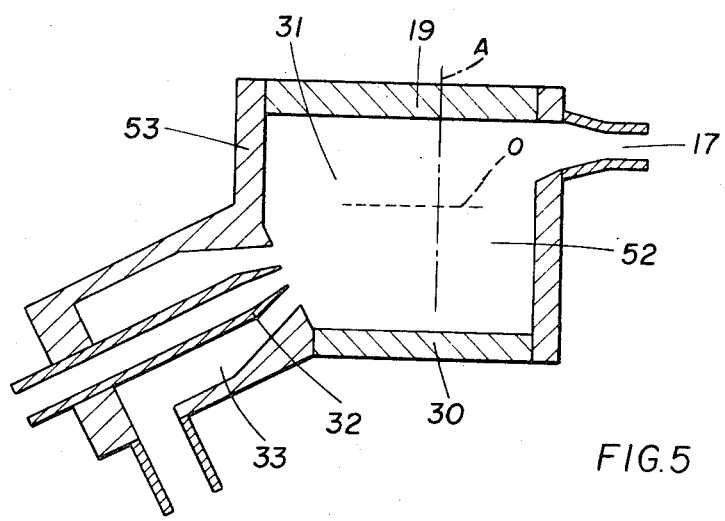

FIG. 5 illustrates a flow chamber in which the formation of a fixed measuring point is dispensed with. This flow chamber consists of a planar light-transmitting base plate 30, a cavity 52 filled with an optically empty, liquid medium, and a likewise planar, light-transmitting cover plate 19. The inflow of the dispersion occurs through a capillary tube 32 tapering toward the interior 52 of the flow chamber. The optically empty liquid for the enveloping stream is admitted through an annular channel 33 which envelopes the capillary tube 32. The mutually parallel channels for the enveloping stream 33 and for the dispersion stream 32 are disposed on the side wall 53 of the flow chamber in such a way that the dispersion stream forms with the optical axis A of the microscope an angle differing from 90°. The dispersion stream then completely traverses the measuring range 31, provided in chamber 52 by focussing the microscope onto some plane 0 between 32 and 17, and traverses it in an oblique direction having a component which coincides with the direction of the optical axis. Opposite the discharge of the dispersion into the flow chamber is a drain 27, through which the dispersion together with its enveloping stream is drawn off. To attain as high as possible a light density in the measuring plane 31, the field diaphragm is projected by means of a condenser into the measuring plane in range 31 by the incident and/or transmitted light method. That the angle between the dispersion stream and the optical axis of the microscope differs from 90° assures that the dispersion stream traverses the measuring range, that is or the entire depth of field of the microscope, projected onto the photomultiplier or the measuring diaphragm, and traverses it with a velocity component parallel to the optical axis. It is thereby also achieved that every particle of the dispersion traverses the depth of field of the microscope in uniform manner. The dispersed and/or fluorescent light emitted by each particle upon passage through the measuring point passes through the light-transmitting cover plate 19 and through the microscope arrangement, in the manner already described, to one or more photomultipliers, which furnish the photoelectric current signals needed for electronic evaluation.

What is claimed is:

1. A method of flow photometry of particles of a fluid dispersion comprising:
   focusing a beam of light to a focal plane of microscopic depth to homogeneously illuminate a measuring region within said focal plane;
   passing a particle carrying first fluid dispersion through said plane in a direction having a component perpendicular to said focal plane;
   continuously passing a second fluid past the focal plane in a direction to wash the dispersion from said focal plane;
   directing light emanating from particles only in said focal plane to a photodetector; and
   analyzing a characteristic of the dispersion using the information derived from the photodetector.

2. A method according to claim 1, further including forming an envelope of a third fluid about the dispersion as it is passed into said measuring region.

3. A method of flow photometry of particles of a fluid dispersion comprising:
   focusing a beam of light to a focal plane of microscopic depth to homogeneously illuminate a measuring region within said focal plane;
   passing a particle carrying first fluid dispersion through said plane in a direction having a component perpendicular to said focal plane;
   forming an envelope of a second fluid about the dispersion as it is passed into the measuring region;
   directing light emanating from particles only in said focal plane to a photodetector; an
   analyzing a characteristic of the dispersion using the information derived from the photodetector.

4. An apparatus for flow photometry of microscopic particles in a fluid dispersion comprising the combination of:
   a flow chamber having a transparent wall;
   a light source;
   an optical system including
   means for focusing a beam of light to a focal plane of microscopic depth within said chamber to homogeneously illuminate a measuring region within said focal plane, and
   means for detecting light emanating only from particles passing through said focal plane and for producing a signal usable to analyze a characteristic of said dispersion;
   means for conducting a first fluid dispersion current through said focal plane with a velocity component normal to said focal plane; and
   means for continuously conducting a second fluid past said focal plane to remove particles which have passed through said focal plane.

5. Apparatus according to claim 4 wherein said means for conducting a fluid dispersion includes
   first and second tubes having concentric end portions, said first tube being within said second tube and carrying the dispersion current in the direction of the focal plane, and
   said second tube providing an enveloping current of fluid around said dispersion as said particles move through said focal plane.

6. An apparatus for flow photometry of microscopic particles in a fluid dispersion comprising the combination of:
   a flow chamber having at least one transparent wall and filled with fluid;
   a light source;
   an optical system including
   means for focusing a beam of light to a focal plane of microscopic depth within said chamber to homogeneously illuminate a measuring region within said focal plane, and
   means for detecting light emanating only from particles passing through said focal plane and for producing a signal usable to analyze a characteristic of said dispersion; and
   means for conducting a fluid dispersion current through said focal plane with a velocity component normal to said focal plane,
   wherein said means for conducting a fluid dispersion includes
   a first tube having an end spaced from said focal plane for conducting an enveloping fluid,
   a second tube located within said first tube and having an end spaced from said focal plane for directing a dispersion current towards said focal plane said first tube providing an enveloping current of fluid around said dispersion current as said particles approach said focal plane, and
   a third tube to permit said fluids to leave said chamber.

* * * * *